(12) United States Patent
Ko

(10) Patent No.: US 10,963,084 B2
(45) Date of Patent: Mar. 30, 2021

(54) TOUCH SENSOR

(71) Applicant: Samsung Display Co., Ltd., Yongin-si (KR)

(72) Inventor: Gwang Bum Ko, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/809,484

(22) Filed: Mar. 4, 2020

(65) Prior Publication Data

US 2020/0319740 A1 Oct. 8, 2020

(30) Foreign Application Priority Data

Apr. 2, 2019 (KR) .................. 10-2019-0038655

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04112* (2013.01)

(58) Field of Classification Search
CPC ........ G06F 3/041; G06F 3/0412; G06F 3/044; G06F 3/0443; G06F 3/045; G06F 2203/04112
See application file for complete search history.

(56) References Cited

U.S. PATENT DOCUMENTS

| | | | |
|---|---|---|---|
| 8,970,515 B2 | 3/2015 | Moran et al. | |
| 9,081,453 B2 * | 7/2015 | Bulea ..................... | G06F 3/041 |
| 9,292,138 B2 * | 3/2016 | Gourevitch ........... | G06F 3/0446 |
| 10,775,916 B2 * | 9/2020 | Kim ........................ | G06F 3/044 |
| 10,775,942 B2 * | 9/2020 | Han ....................... | G06F 3/0416 |
| 2010/0258360 A1 * | 10/2010 | Yilmaz ............... | G06F 3/04166 |
| | | | 178/18.06 |
| 2011/0048812 A1 * | 3/2011 | Yilmaz ................. | G06F 3/0443 |
| | | | 178/18.06 |
| 2013/0081869 A1 * | 4/2013 | Kim ...................... | G06F 3/0443 |
| | | | 174/261 |
| 2013/0314374 A1 | 11/2013 | Kim et al. | |

FOREIGN PATENT DOCUMENTS

| KR | 10-1339692 | 12/2013 |
|---|---|---|
| KR | 10-1786119 | 10/2017 |

* cited by examiner

*Primary Examiner* — Joe H Cheng

(74) *Attorney, Agent, or Firm* — H.C. Park & Associates, PLC

(57) ABSTRACT

A touch sensor includes sensing blocks. Each of the sensing blocks includes first sensing cells of a first group, first sensing cells of a second group, and second sensing cells. The first sensing cells of the first group are arranged in a first direction, spaced apart from each other with first separation areas therebetween, and coupled to an identical first electrical node. The first sensing cells of the second group are arranged in the first direction, spaced apart from each other with second separation areas therebetween, and coupled to an identical second electrical node. The second sensing cells respectively extend in a second direction in the first separation areas and the second separation areas. First sensing cells at borders of respective sensing blocks adjacent in the first direction are coupled to different electrical nodes.

20 Claims, 14 Drawing Sheets

TOUCH SENSOR

CROSS-REFERENCE TO RELATED APPLICATION

This application claims priority from and the benefit of Korean Patent Application No. 10-2019-0038655, filed Apr. 2, 2019, which is hereby incorporated by reference for all purposes as if fully set forth herein.

BACKGROUND

Field

Various exemplary embodiments generally relate to a touch sensor.

Discussion

The development of information technology has emphasized the importance of display devices, which serve as a connecting medium between information and users. As such, the use of display devices, such as liquid crystal display devices, organic light-emitting display devices, plasma display devices, and the like, is increasing. To provide a more convenient input means, display devices may equipped with a touch sensor. For example, a touch sensor may be attached to one side of a display panel or may be integrated in a display panel, thereby enabling the sensation of touch interactions.

The above information disclosed in this section is only for understanding the background of the inventive concepts, and, therefore, may contain information that does not form prior art.

SUMMARY

Some exemplary embodiments are directed to a touch sensor not only capable of alleviating a retransmission issue, but also achieve relatively high sensing resolution in a self-capacitance driving mode.

Additional aspects will be set forth in the detailed description which follows, and, in part, will be apparent from the disclosure, or may be learned by practice of the inventive concepts.

According to some exemplary embodiments, a touch sensor includes sensing blocks. Each of the sensing blocks includes first sensing cells of a first group, first sensing cells of a second group, and second sensing cells. The first sensing cells of the first group are arranged in a first direction, spaced apart from each other with first separation areas therebetween, and coupled to an identical first electrical node. The first sensing cells of the second group are arranged in the first direction, spaced apart from each other with second separation areas therebetween, and coupled to an identical second electrical node. The second sensing cells respectively extend in a second direction in the first separation areas and the second separation areas. First sensing cells at borders of respective sensing blocks adjacent in the first direction are coupled to different electrical nodes.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 4 is a view for explaining a sensing area according to some exemplary embodiments.

FIG. 5 is a view for explaining a sensing unit in a mutual capacitance driving mode including the sensing area of FIG. 4 according to some exemplary embodiments.

FIG. 6 is a view for explaining a retransmission issue associated with the sensing area of FIG. 4 according to some exemplary embodiments.

FIG. 7 is a view for explaining a sensing unit in a self-capacitance driving mode including the sensing area of FIG. 4 according to some exemplary embodiments.

FIG. 11 is a view for explaining a retransmission issue associated with the sensing area of FIG. 8 according to some exemplary embodiments.

DETAILED DESCRIPTION OF THE ILLUSTRATED EMBODIMENTS

Figure 1:
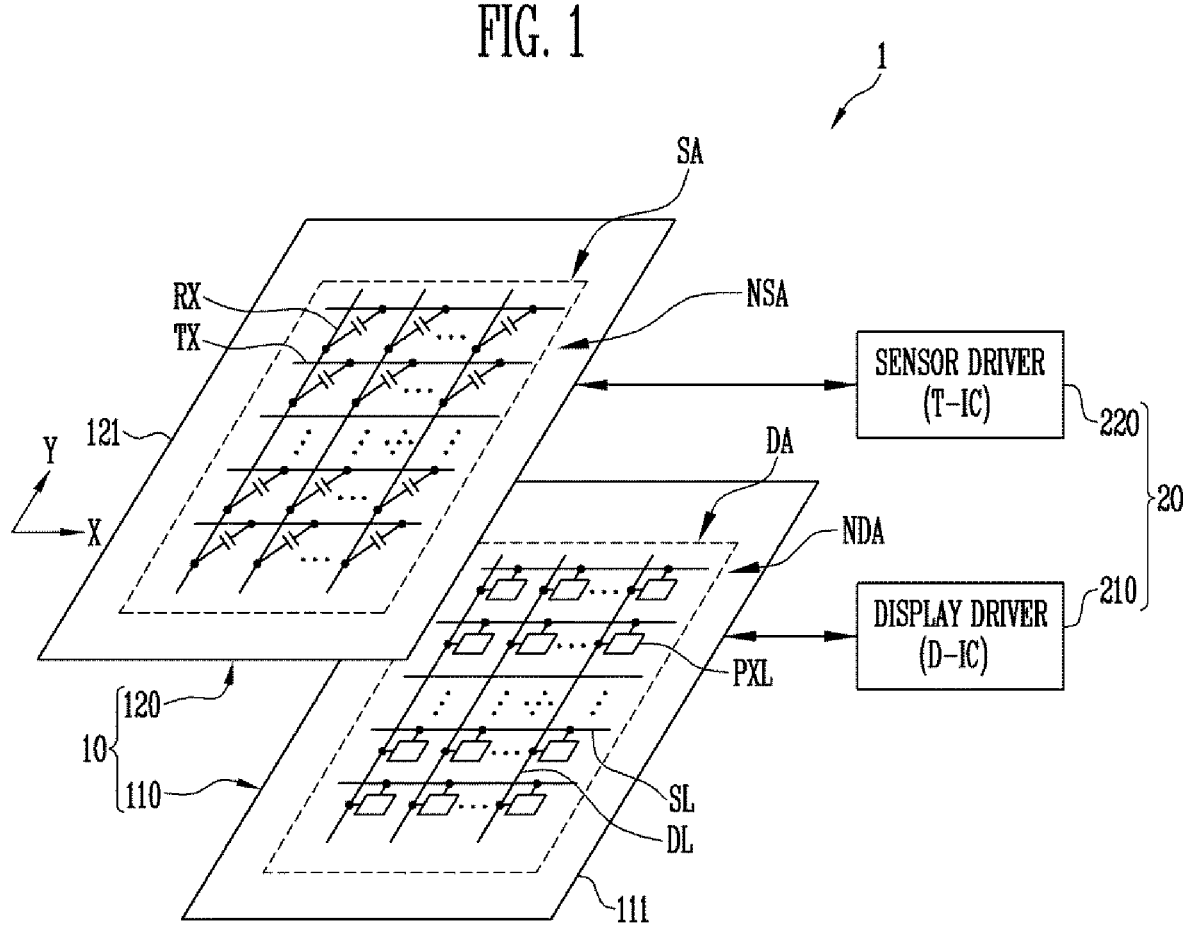
FIG. 1 is a schematic illustration of a display device according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

FIG. 1 is a schematic illustration of a display device according to some exemplary embodiments.

Referring to FIG. 1, the display device 1 according to some exemplary embodiments includes a panel unit 10 and a driving circuit unit 20 configured to drive the panel unit 10. According to some exemplary embodiments, the panel unit 10 includes a display unit (e.g., a display panel) 110 configured to display images and a sensor unit (e.g., a touch screen, a touch panel, or a touch sensing element) 120 configured to sense a touch interaction (e.g., a touch input, a touch approach, a near touch, a hovering touch, and/or the like). The driving circuit unit 20 may include a display driver 210 configured to drive the display unit 110 and a sensor driver 220 configured to drive the sensor unit 120. The sensor unit 120 and the sensor driver 220 may constitute a touch sensor.

According to some exemplary embodiments, the display unit 110 and the sensor unit 120 may be separately produced and then be disposed and/or combined such that at least one area of the display unit overlaps at least one area of the sensor unit. Alternatively, in some exemplary embodiments, the display unit 110 and the sensor unit 120 may be produced so as to form a single unit. For example, the sensor unit 120 may be formed directly on at least one substrate of the display unit 110 (e.g., an upper and/or lower substrate or the thin encapsulation film (TFE) of the display unit 110), an insulation layer, or various types of functional layers (e.g., an optical layer, a protective layer, etc.).

Although the sensor unit 120 is illustrated as being disposed on the front surface of the display unit 110 (e.g., the upper surface on (or through) which an image is displayed) in FIG. 1, the position of the sensor unit 120 is not limited thereto. For example, in some exemplary embodiments, the sensor unit 120 may be disposed on the back surface, may be disposed on opposite sides of the display unit 110, or may be provided in any other suitable manner. Alternatively, in some exemplary embodiments, the sensor unit 120 may be disposed in an edge area on at least one side of the display unit 110.

The display unit 110 includes a display substrate 111 and multiple pixels PXL formed on the display substrate 111. The pixels PXL may be disposed in a display area DA on the display substrate 111.

The display substrate 111 includes the display area DA, in which an image is displayed, and a non-display area NDA, which is disposed outside (e.g., around) the display area DA. According to some exemplary embodiments, the display area DA may be disposed in the center (or central) area of the display unit 110, and the non-display area NDA may be disposed along the edges of the display unit 110 so as to surround the display area DA.

The display substrate 111 may be a rigid substrate or a flexible substrate, and the material(s) and/or properties thereof are not limited to any specific material or property. For example, the display substrate 111 may be a rigid substrate configured with glass or tempered glass, or a flexible substrate configured with plastic or a thin film made of metal.

Scan lines SL, data lines DL, and the pixels PXL coupled to the scan lines SL and the data lines DL are disposed in the display area DA. The pixels PXL are supplied with data signals from the data lines DL in association with being selected by scan signals supplied from the scan lines SL. In this manner, the pixels PXL emit light having brightness corresponding to the data signals. Accordingly, an image corresponding to the data signals is displayed in the display area DA. For the purposes of this disclosure, the structure and the driving method of the pixels PXL are not limited. For example, each of the pixels PXL may be implemented so as to use any suitable structure and/or driving method.

Although not shown, in the non-display area NDA, various types of lines coupled to the pixels PXL in the display area DA and/or an embedded circuit unit may be disposed. For example, multiple lines configured to supply various kinds of driving power and/or driving signals to the display area DA may be disposed in the non-display area NDA, and a scan driving circuit and/or the like may be further disposed in the non-display area NDA.

According to some exemplary embodiments, the type of the display unit 110 is not limited to any specific type. For example, the display unit 110 may be implemented as a display panel capable of emitting light by itself, such as an organic light-emitting display (OLED) panel, or the like. Alternatively, the display unit 110 may be implemented as a non-emissive display panel, such as a liquid crystal display (LCD) panel or the like. When the display unit 110 is implemented as a non-emissive display panel, the display device 1 may additionally include a light source, such as a backlight unit (not shown).

The sensor unit 120 includes a sensor substrate 121 and multiple sensing cells TX and RX formed on the sensor substrate 121. The first and second sensing cells TX and RX may be disposed in a sensing area SA on the sensor substrate 121.

The sensor substrate 121 includes the sensing area SA, in which a touch interaction (e.g., touch input) may be sensed, and a surrounding area NSA that is outside (e.g., surrounds) the sensing area SA. Hereinafter, the term touch interaction may be used interchangeably with the term touch input. According to some exemplary embodiments, the sensing area SA may be disposed so as to overlap at least one area of the display area DA. For example, the sensing area SA may be set so as to correspond to the display area DA (e.g., an area overlapping the display area DA), and the surrounding area NSA may be set so as to correspond to the non-display area NDA (e.g., an area overlapping the non-display area NDA). In this case, when a touch input is provided to (or near) the display area DA, the touch input may be sensed by the sensor unit 120.

The sensor substrate 121 may be a rigid or flexible substrate, and may be configured with (or including) at least one insulation layer. Also, the sensor substrate 121 may be a transparent or translucent emissive substrate, but the sensor substrate 121 is not limited thereto. As such, the materials and/or properties of the sensor substrate 121 are not limited to any specific material or property. For example, the sensor substrate 121 may be a rigid substrate configured with glass or tempered glass, or a flexible substrate configured with plastic or a thin film made of metal. Also, according to some exemplary embodiments, at least one substrate of the display unit 110 (e.g., the display substrate 111, an encapsulation substrate, and/or a thin encapsulation film), or at least one insulation layer or functional layer disposed in the display unit 110 and/or disposed on the external surface of the display unit 110 may be used as the sensor substrate 121.

The sensing area SA may be set to an area that is capable of responding to touch input (e.g., an area in which a touch sensor is enabled and/or configured). To this end, the first and second sensing cells TX and RX configured to sense a touch input may be disposed in the sensing area SA. According to some exemplary embodiments, the first and second sensing cells TX and RX may include first sensing cells TX and second sensing cells RX.

According to some exemplary embodiments, each of the first sensing cells TX and the second sensing cells RX may have conductivity by including at least one of a metallic material, a transparent conductive material, and/or other conductive materials. For example, the first sensing cells TX and the second sensing cells RX may include at least one of various metallic materials, such as gold (Au), silver (Ag), aluminum (Al), molybdenum (Mo), chromium (Cr), titanium (Ti), nickel (Ni), neodymium (Nd), copper (Cu), platinum (Pt), and the like, a combination of at least two of these metallic materials, or an alloy including at least one of these metallic materials. Additionally or alternatively, the first sensing cells TX and the second sensing cells RX may include at least one of various transparent conductive materials, such as silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotube, graphene, and/or the like. Additionally or alternatively, the first sensing cells TX and the second sensing cells RX may include at least one of various conductive materials, thereby having conductivity. It is also contemplated that each of the first sensing cells TX and the second sensing cells RX may be configured with a single layer or multiple layers, and a cross-sectional structure of the first sensing cells TX and the second sensing cells RX are not limited to any specific structure.

When the first sensing cells TX intersect with the second sensing cells RX, at least one insulation layer (or insulation pattern) or a separation space may be disposed therebetween (e.g., at least at intersections of the first sensing cells TX and the second sensing cells RX).

Alternatively, in some exemplary embodiments, the first sensing cells TX and the second sensing cells RX may be distributed (or arranged) on a same layer of the sensing area SA such that they do not intersect. It is noted, however, that interconnecting electrodes (not shown) of the first sensing cells TX and the second sensing cells RX may overlap. In this case, an interlayer insulation layer may not be disposed between the first sensing cells TX and the second sensing cells RX, and may be possible to simultaneously pattern the first sensing cells TX and the second sensing cells RX through a single mask process. As described above, when the first sensing cells TX and the second sensing cells RX are disposed on the same layer, a mask process may be minimized or reduced, and, as such, the manufacturing costs of the touch sensor and the display device 1 having the touch sensor may be reduced, and the widths of the touch sensor and the display device 1 may be minimized or reduced.

Sensor lines configured to electrically couple the first and second sensing cells TX and RX to the sensor driver 220 may be disposed in the surrounding area NSA of the sensor unit 120.

The driving circuit unit 20 may include the display driver 210 configured to drive the display unit 110 and the sensor driver 220 configured to drive the sensor unit 120. According to some exemplary embodiments, the display driver 210 and the sensor driver 220 may be configured to be separate from each other, or at least one portion of the display driver 210 and at least one portion of the sensor driver 220 may be integrated into a single driver integrated circuit (IC). It is also contemplated that the driving circuit unit 20 may include one or more other circuits, such as a timing controller circuit, a emission control circuit, etc.

The display driver 210 may be electrically coupled to the display unit 110, and, thereby, electrically coupled to the display unit 110 to drive the pixels PXL. To this end, the display driver 210 may include a scan driver configured to supply scan signals to the scan lines SL, a data driver configured to supply data signals to the data lines DL, and a timing controller configured to control the scan driver and the data driver. According to some exemplary embodiments, the scan driver, the data driver, and/or the timing controller may be integrated into a single display IC, but the structure is not limited thereto. For example, in some exemplary embodiments, the scan driver, the data driver, and/or the timing controller may be embedded in the display unit 110 or otherwise coupled to the panel unit 10.

The sensor driver 220 is electrically coupled to the sensor unit 120, and, thereby, electrically coupled to the sensor unit 120 to drive the sensor unit 120. The sensor driver 220 may include a touch driving circuit and a touch sensing circuit. According to some exemplary embodiments, the touch driving circuit and the touch sensing circuit may be integrated into a single touch IC, but the structure is not limited thereto.

The above-described display device 1 includes a touch sensor, thereby providing user convenience. For example, a user may easily control the display device 1 by touching or otherwise interacting with a screen while viewing an image displayed via the display area DA.

Figure 2:
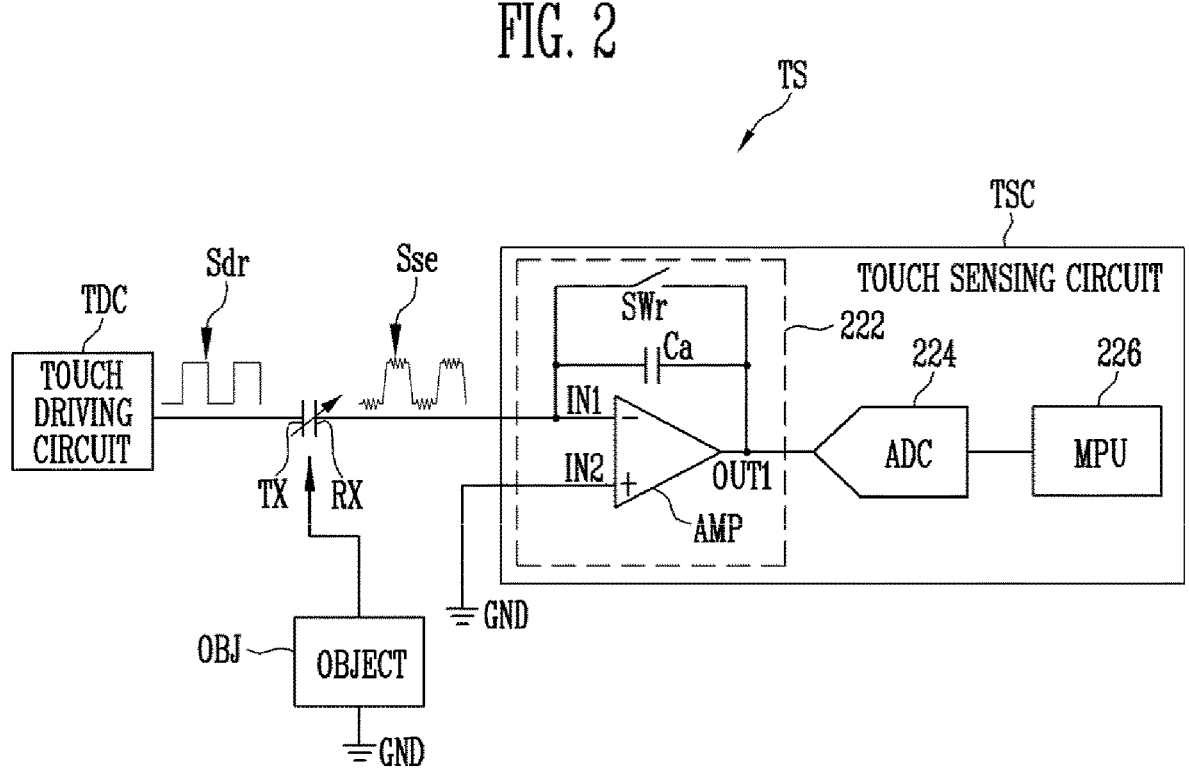
FIG. 2 is a view for explaining a driving method of a touch sensor according to some exemplary embodiments.

FIG. 2 is a view for explaining a driving method of a touch sensor according to some exemplary embodiments.

A case in which a touch sensor TS operates in a mutual capacitance driving mode will be described with reference to FIG. 2. As such, FIG. 2 illustrates the configuration of the sensor unit 120 and the sensor driver 220 based on any one channel of the touch sensor TS.

A first sensing cell TX may be coupled to a touch driving circuit TDC, and a second sensing cell RX may be coupled to a touch sensing circuit TSC.

The touch sensing circuit TSC includes an operational amplifier AMP, and the second sensing cell RX may be coupled to the first input terminal IN1 of the operational amplifier AMP. The second input terminal IN2 of the operational amplifier AMP may be coupled to a reference voltage source GND.

Describing a driving method of the touch sensor TS, a driving signal Sdr is supplied from the touch driving circuit TDC to the first sensing cell TX during a touch sensing period in which a touch sensing mode is enabled. According to some exemplary embodiments, the driving signal Sdr may be an alternating current signal having a predetermined period, such as a pulse wave.

The touch sensing circuit TSC may sense the second sensing cell RX using a sensing signal Sse generated by (or based on) the driving signal Sdr. The sensing signal Sse may be generated based on mutual capacitance formed by the first sensing cell TX and the second sensing cell RX. Depending on the degree of proximity of an object OBJ (e.g., a user's finger, stylus, or the like) to the first sensing cell TX, the mutual capacitance formed by the first sensing cell TX and the second sensing cell RX may vary, whereby the sensing signal Sse may vary. Using such variance of the sensing signal Sse, whether a touch interaction by the object OBJ has occurred may be detected.

When the sensor unit 120 includes multiple first sensing cells TX as shown in FIG. 1, the touch driving circuit TDC may sequentially supply driving signals Sdr to the first sensing cells TX during the touch sensing period.

Also, when the sensor unit 120 includes multiple second sensing cells RX as shown in FIG. 1, the touch sensing circuit TSC may include multiple sensing channels 222 electrically coupled to the second sensing cells RX of each group. Such a touch sensing circuit TSC receives sensing signals Sse from the second sensing cells RX for the respective driving signals Sdr through the sensing channels 222 and aggregates the received sensing signals Sse, thereby detecting a touch input (e.g., the position and the strength of a touch interaction).

According to some exemplary embodiments, each of the second sensing cells RX and an operational amplifier AMP coupled thereto (or an analog front end (AFE) having an operational amplifier AMP) may be regarded as constituting each sensing channel 222. It is noted, however, that, for the convenience of description, the second sensing cells RX provided to the sensor unit 120 and the sensing channels 222 that constitute the signal receiver of the touch sensing circuit TSC will be described as being separate from each other.

The touch sensing circuit TSC amplifies, modulates, and processes sensing signals SSe input from the respective second sensing cells RX, thereby detecting a touch input. To this end, the touch sensing circuit TSC may include the sensing channels 222, which correspond to the second sensing cells RX, respectively, an analog-to-digital converter (ADC) 224 coupled to the sensing channels 222, and a processor 226.

According to some exemplary embodiments, each of the sensing channels 222 may include an AFE configured to receive a sensing signal Sse from the second sensing cell RX corresponding thereto. For example, each of the sensing channels 222 may be implemented as an AFE including at least one operational amplifier AMP.

The sensing channel 222 includes a first input terminal IN1 (e.g., an inverse input terminal of the operational amplifier AMP) and a second input terminal IN2 (e.g., a non-inverse input terminal of the operational amplifier AMP), and may generate an output signal corresponding to a voltage difference between the first input terminal IN1 and the second input terminal IN2. For example, the sensing channel 222 may amplify the voltage difference between the first input terminal IN1 and the second input terminal IN2 so as to correspond to a predetermined gain (through differential amplification) and output the amplified voltage.

The second input terminal IN2 of each of the sensing channels 222 may be a reference potential terminal, and, for example, the second input terminal IN2 may be coupled to a reference voltage source GND, such as ground. Accordingly, the sensing channel 222 amplifies a sensing signal Sse, input to the first input terminal IN1, based on the potential of the second input terminal IN2 and outputs the amplified sensing signal. That is, each of the sensing channels 222 receives a sensing signal Sse from a corresponding one of the second sensing cells RX through the first input terminal IN1, amplifies a signal corresponding to the difference between the voltage of the first input terminal IN1 and the voltage of the second input terminal IN2 (differential voltage), and outputs the amplified signal, thereby amplifying the sensing signal Sse.

According to some exemplary embodiments, the operational amplifier AMP may be implemented as an integrator. In this case, a capacitor Ca and a reset switch SWr may be coupled in parallel between the first input terminal IN1 and the output terminal OUT1 of the operational amplifier AMP. For example, the reset switch SWr may be turned on before the sensing signal Sse is sensed, whereby an electric charge in the capacitor Ca may be initialized. When the sensing signal Sse is sensed, the reset switch SWr may be in a turn-off state.

The ADC 224 converts an analog signal, input from each of the sensing channels 222, into a digital signal. According to some exemplary embodiments, as many ADCs 224 as the number of second sensing cells RX may be arranged such that the ADCs 224 correspond to the sensing channels 222 for the second sensing cells RX in a one-to-one manner. In some exemplary embodiments, at least two sensing channels 222 may share a single ADC 224. In this case, a switch (not shown) for selecting a channel may be further arranged between the ADC 224 and the sensing channels 222.

The processor 226 detects a touch input using the sensing signal Sse, which is output from each of the second sensing cells RX. For example, the processor 226 processes the signal, input from each of the multiple second sensing cells RX via the corresponding sensing channel 222 and ADC 224 (e.g., the sensing signal Sse that is amplified and converted into a digital signal), such that the signal has a predetermined form so as to be analyzable. Then, the processor 226 collectively analyzes the sensing signals Sse output from the second sensing cells RX, thereby detecting whether a touch input is generated and the position at which the touch input is generated.

According to some exemplary embodiments, the processor 226 may be implemented as a microprocessor MPU. In this case, a memory (not shown) to drive the processor 226 may be further included in (or accessible to) the touch sensing circuit TSC. The configuration of the processor 226, however, is not limited to the above description. In some exemplary embodiments, the processor 226 may be implemented as a microcontroller MCU and/or the like.

Figure 3:
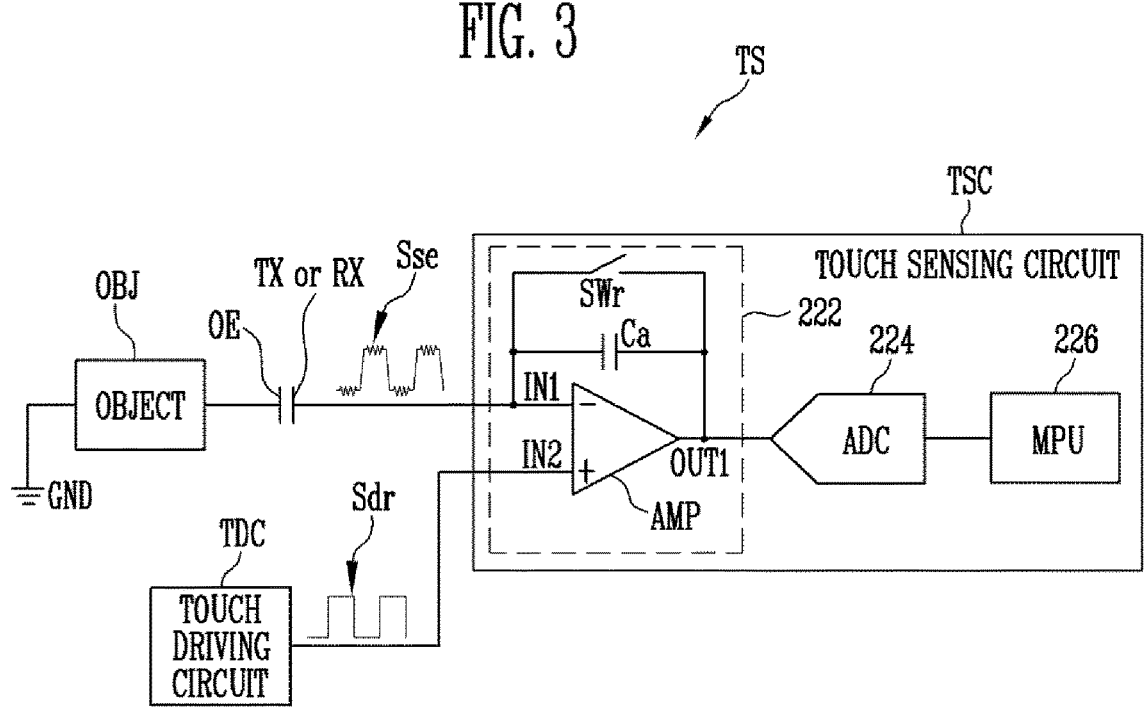
FIG. 3 is a view for explaining a driving method of a touch sensor according to some exemplary embodiments.

FIG. 3 is a view for explaining a driving method of a touch sensor according to some exemplary embodiments.

A case in which a touch sensor TS operates in a self-capacitance driving mode will be described with reference to FIG. 3. Further, FIG. 3 illustrates the configuration of the sensor unit 120 and the sensor driver 220 based on any one channel of the touch sensor TS.

A first sensing cell TX or a second sensing cell RX may be coupled to a touch sensing circuit TSC. For instance, at least some of the first sensing cells TX and the second sensing cells RX may be coupled to a sensing channel 222 corresponding thereto.

Unlike the mutual capacitance driving mode, the self-capacitance driving mode may be configured such that the first sensing cell TX or the second sensing cell RX is coupled to the first input terminal IN1 of an operational amplifier AMP corresponding thereto. The second input terminal IN2 of the operational amplifier AMP may be coupled to a touch driving circuit TDC.

The touch sensing circuit TSC may sense the second sensing cell RX using a sensing signal Sse generated by (or based on) a driving signal Sdr. When an object OBJ (e.g., a user's finger, stylus, or the like) is close to the first sensing cell TX or the second sensing cell RX, a sensing signal Sse is generated based on self-capacitance formed by the object surface OE and the first sensing cell TX or the second sensing cell RX. Conversely, when the object OBJ is not close to the first sensing cell TX or the second sensing cell RX, a sensing signal Sse is generated regardless of self-capacitance. Using such variance of the sensing signal Sse, whether a touch by the object OBJ has occurred may be detected.

A repeated description of the touch sensing circuit TSC and the touch driving circuit TDC is omitted to avoid obscuring exemplary embodiments.

Figure 4:
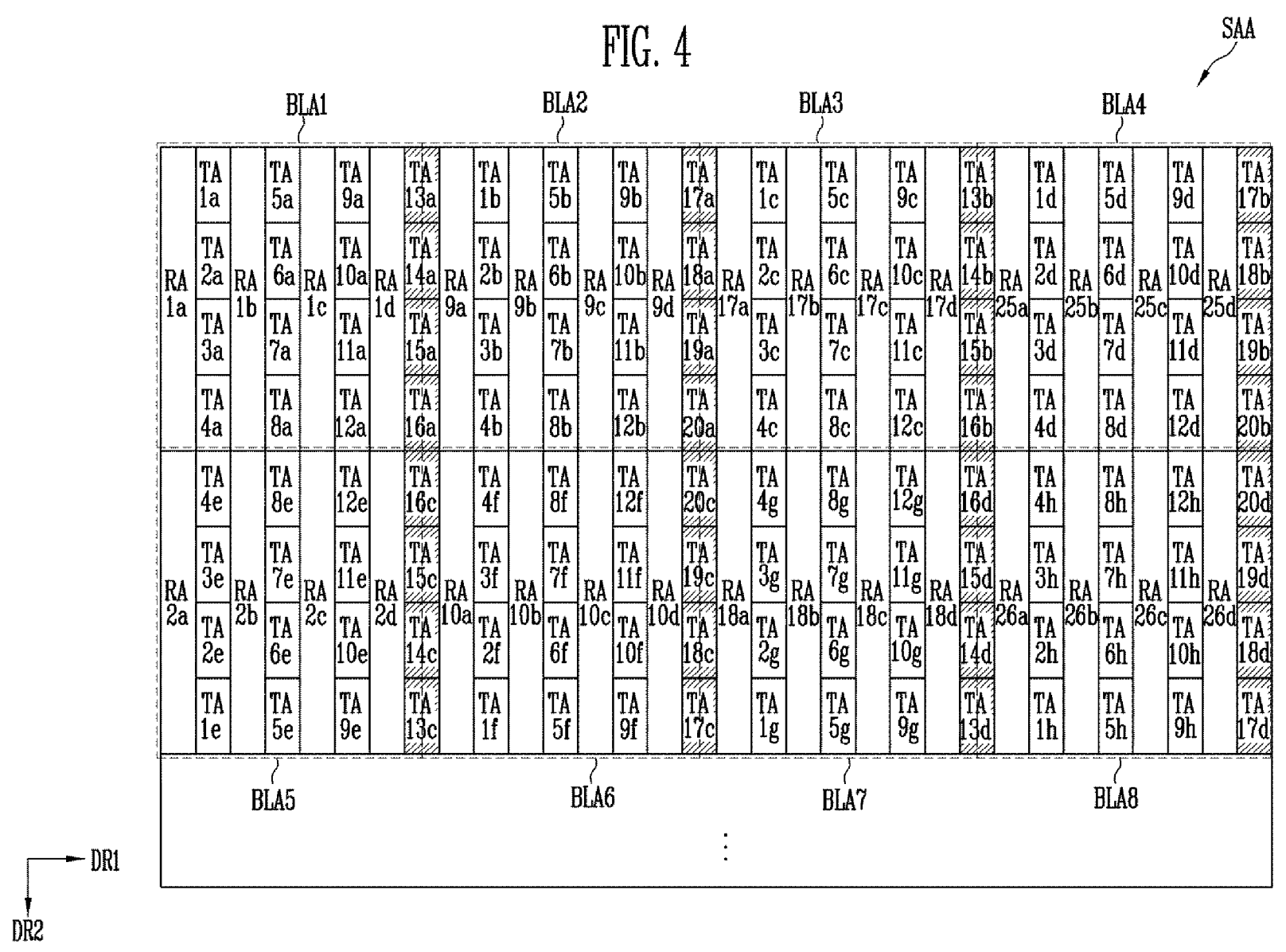
Figure 5:
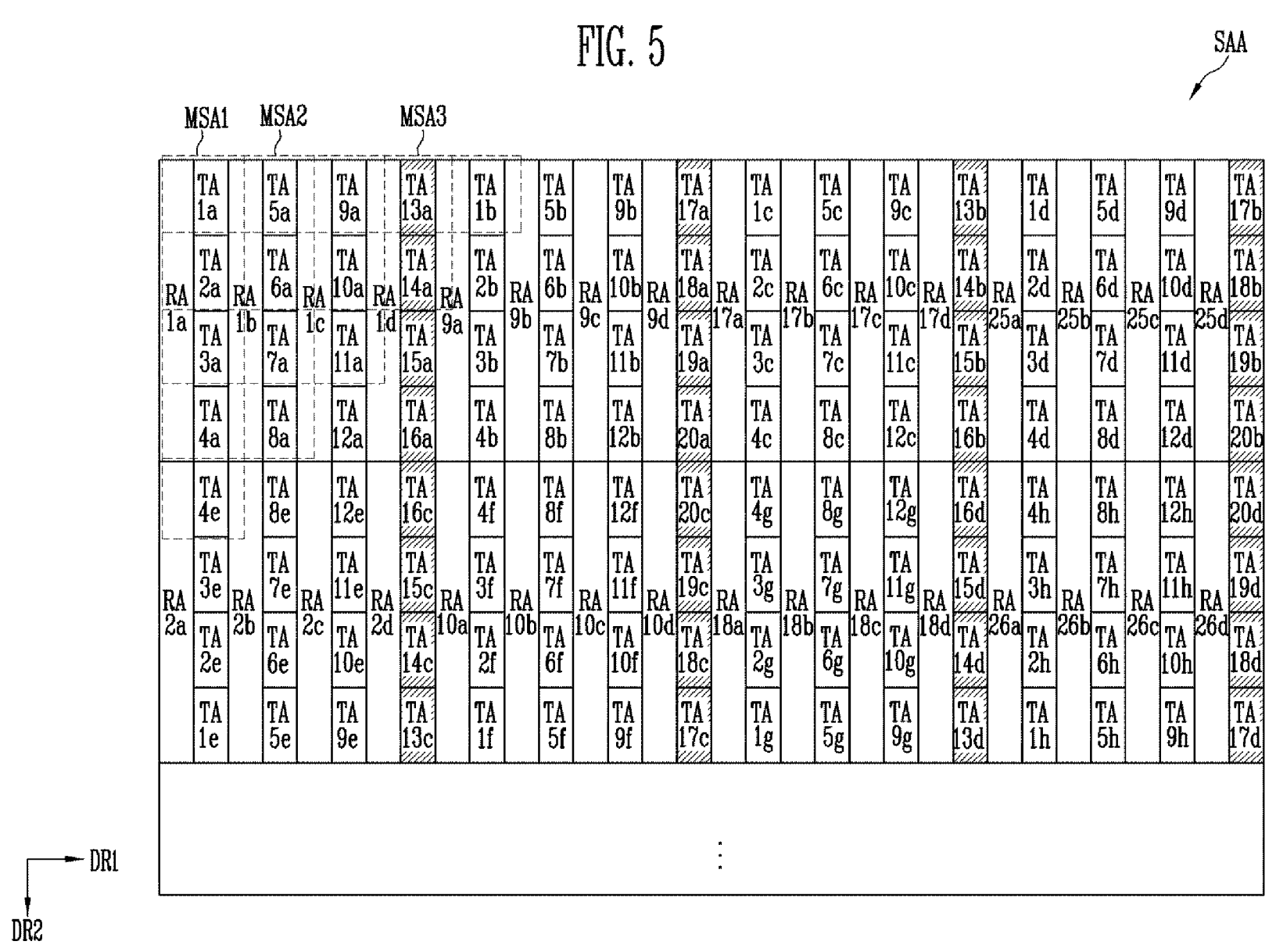
Figure 6:
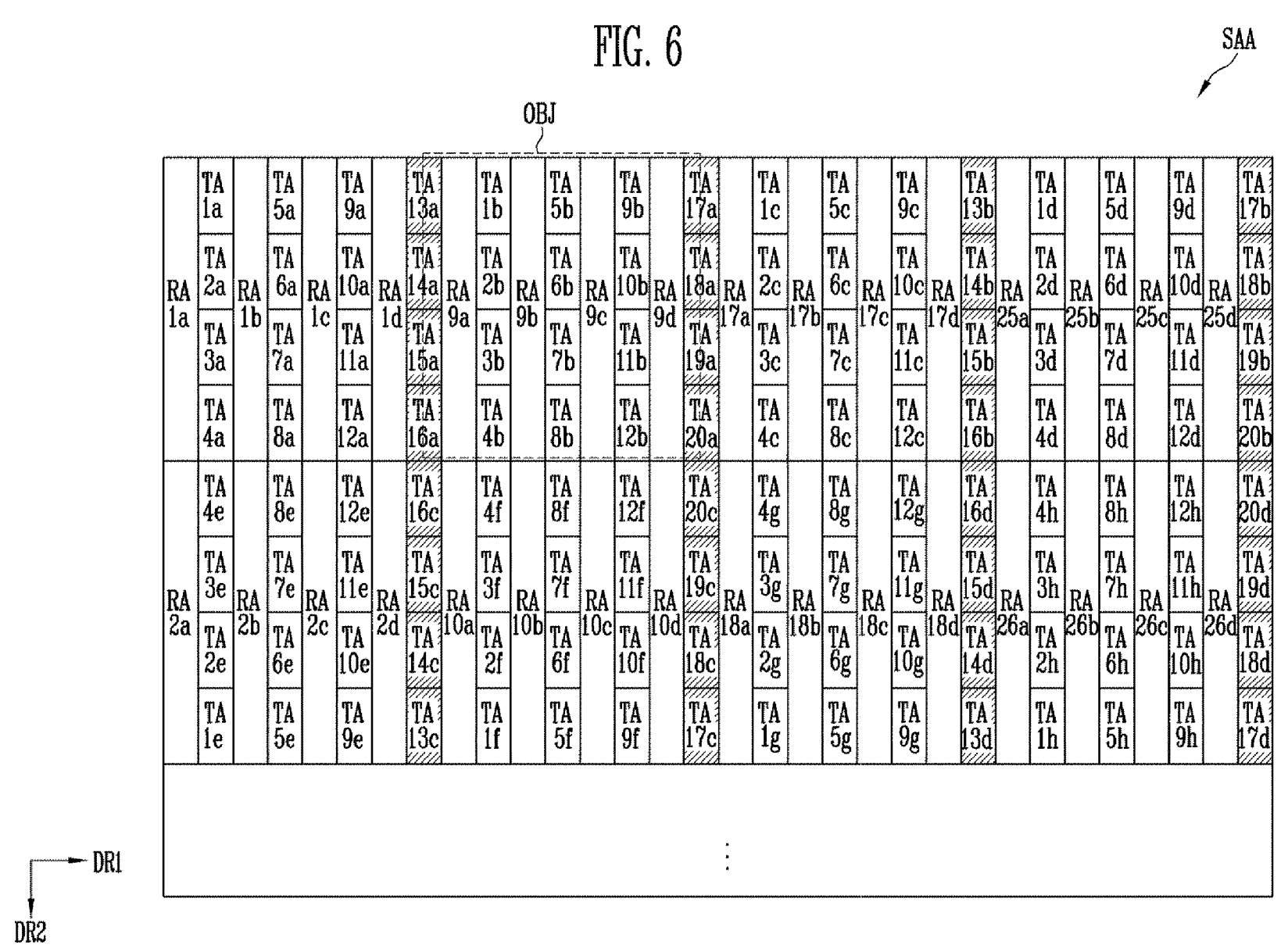
Figure 7:
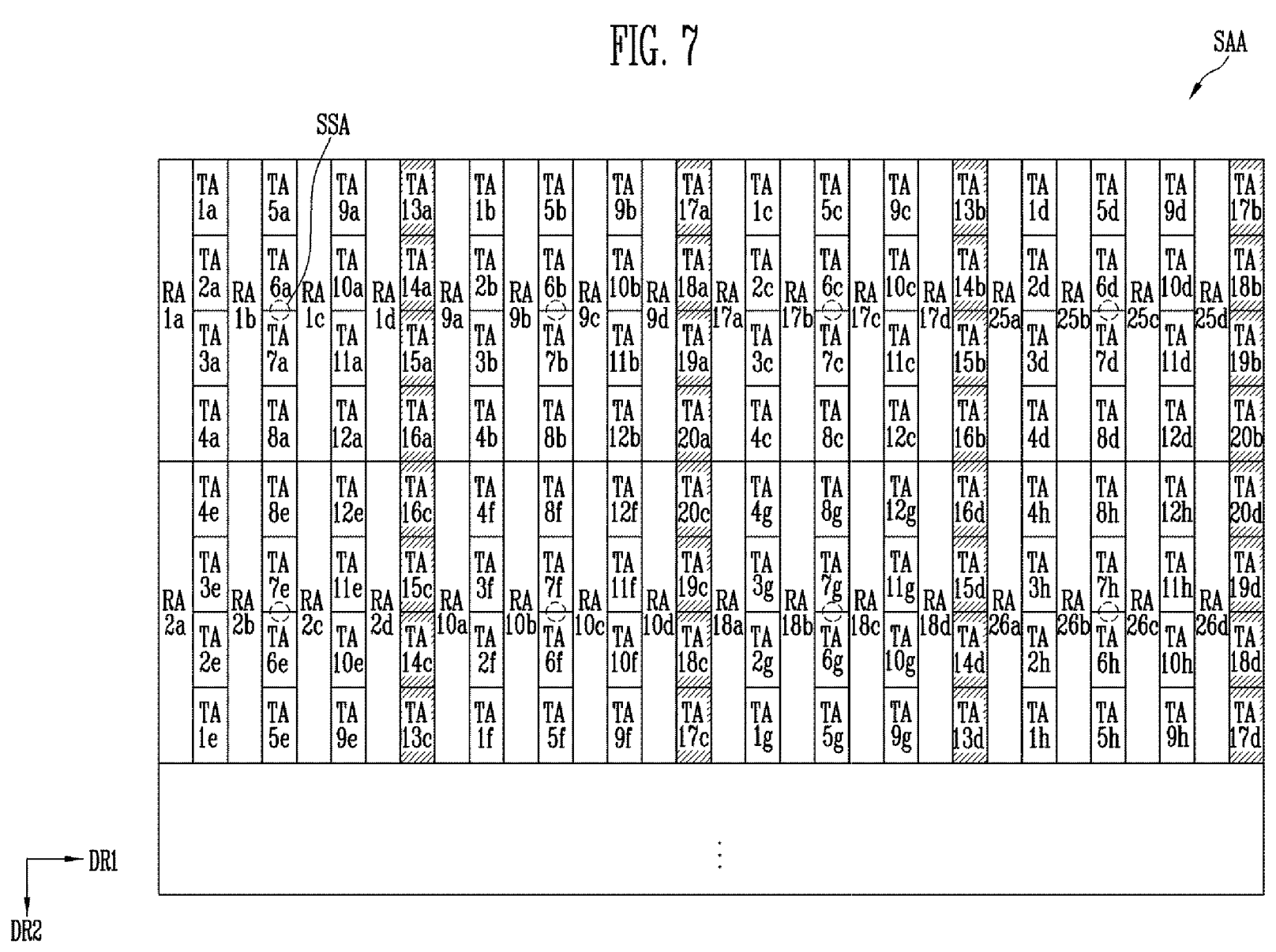

Hereinafter, a sensing area SAA will be described with reference to FIGS. 4 to 7. In FIGS. 4 to 6, a description based on a mutual capacitance driving mode will be made. In FIG. 7, a description based on a self-capacitance driving mode will be made.

FIG. 4 is a view for explaining a sensing area according to some exemplary embodiments.

Referring to FIG. 4, the sensing area SAA includes multiple sensing blocks BLA1 to BLA8. The sensing blocks BLA1 to BLA8 include first sensing cells TA1a to TA17d and second sensing cells RA1a to RA26d corresponding thereto. Each of the sensing blocks BLA1 to BLA8 includes a group of second sensing cells coupled to the same node. For example, the second sensing cells RA1a, RA1b, RA1c, and RA1d of the sensing block BLA1 may be coupled to the same node. Accordingly, the second sensing cells RA1a, RA1b, RA1c, and RA1d may be coupled to the same sensing channel 222, and may be simultaneously sensed. Similarly, the second sensing cells RA9a, RA9b, RA9c, and RA9d of the sensing block BLA2 may be coupled to the same node. Accordingly, the second sensing cells RA9a, RA9b, RA9c, and RA9d may be coupled to the same sensing channel 222, and may be simultaneously sensed. A repeated description of the other sensing blocks BLA3 to BLA8 is omitted.

Each of the sensing blocks BLA1 to BLA8 includes first sensing cells coupled to different nodes. For example, the first sensing cells TA1a to TA16a of the sensing block BLA1 may be coupled to different nodes, and may receive driving signals Sdr from the touch driving circuit TDC at different times. Similarly, the first sensing cells TA13a to TA20a of the sensing block BLA2 may be coupled to different nodes, and may receive driving signals Sdr from the touch driving circuit TDC at different times.

As seen in FIG. 4, the first sensing cells placed (or disposed) at the borders of the respective sensing blocks adjacent in a first direction DR1 have the same electrical node. For example, the sensing blocks BLA1 and BLA2 share the first sensing cells TA13a, TA14a, TA15a, and TA16a at the border therebetween. Also, for example, the sensing blocks BLA2 and BLA3 share the first sensing cells TA17a, TA18a, TA19a, and TA20a at the border therebetween.

FIG. 5 is a view for explaining a sensing unit in a mutual capacitance driving mode including the sensing area of FIG. 4 according to some exemplary embodiments.

For example, the touch driving circuit TDC may simultaneously supply driving signals Sdr to the first sensing cells TA1a, TA1b, TA1c, TA1d, TA1e, TA1f, TA1g, and TA1h, which are coupled to the same node. The touch sensing circuit TSC may sense whether a touch is input using the sensing signals Sse input to the multiple sensing channels 222. For example, when the sensing signal Sse input to the sensing channel 222 coupled to the second sensing cells RA1a, RA1b, RA1c, and RA1d is based on the changed mutual capacitance, the touch sensing circuit TSC may sense that a touch is generated in the sensing unit area MSA1.

Also, for example, the touch driving circuit TDC may simultaneously supply driving signals Sdr to the first sensing cells TA5a, TA5b, TA5c, TA5d, TA5e, TA5f, TA5g, and TA5h, which are coupled to the same node. When the sensing signal Sse input to the sensing channel 222 coupled to the second sensing cells RA1a, RA1b, RA1c, and RA1d is based on the changed mutual capacitance, the touch sensing circuit TSC may sense that a touch is generated in the sensing unit area MSA2.

Also, for example, the touch driving circuit TDC may simultaneously supply driving signals Sdr to the first sensing cells TA13a, TA13b, TA13c, and TA13d, which are coupled to the same node. Here, when the sensing signal Sse input to the sensing channel 222 coupled to the second sensing cells RA1a, RA1b, RA1c, and RA1d and the sensing signal Sse input to the sensing channel 222 coupled to the second sensing cells RA9a, RA9b, RA9c, and RA9d are based on the changed mutual capacitance, the touch sensing circuit TSC may sense that a touch is generated in the sensing unit area MSA3.

That is, the sensing unit area MSA3 is placed at the border between the sensing blocks BLA1 and BLA2, in which case two sensing channels among the sensing channels 222 are utilized to sense the sensing unit area MSA3. The sensing unit areas MSA1 and MSA2 placed inside the sensing block BLA1 sense whether a touch is generated using a single sensing channel 222. Therefore, when the sensing unit area MSA3 is sensed, there is twice as much input noise and twice as much effect on a retransmission issue, which will be described later, as would be when other sensing unit areas (e.g., sensing unit areas MSA1 and MSA2) are sensed. Additionally, different characteristics of the two sensing channels 222 may be reflected as errors in sensing.

These first sensing electrodes TA13a, TA14a, TA15a, and TA16a placed at the border between the sensing blocks BLA1 and BLA2 may be referred to as half nodes.

Also, in some exemplary embodiments described in association with FIG. 5, assuming that the first sensing cells TA1a to TA17d and the second sensing cells RA1a to RA26d have the same width in the first direction DR1, the size of the outermost sensing unit area MSA1 differs from the size of each of other sensing unit areas MSA2 and MSA3 in the sensing area SAA. That is, because the intervals between the centers of the sensing unit areas MSA1, MSA2, and MSA3 differ from each other, it is difficult to precisely detect the position at which a touch is generated.

FIG. 6 is a view for explaining a retransmission issue associated with the sensing area of FIG. 4 according to some exemplary embodiments.

For example, it may be assumed that an object OBJ having the extent corresponding to the extent of the sensing block BLA2 is touched on the sensing block BLA2 of the sensing area SAA. When the object OBJ is properly grounded as shown in FIG. 2, the electric field generated from the first sensing cell TX may be distributed to the object OBJ and the second sensing cell RX. The touch sensing circuit TSC may detect whether a touch is input based on the decreased electric field applied to the second sensing cell RX.

However, in a low ground mass (LGM) environment (e.g., when an object OBJ is not properly grounded) retransmission of the electric field from the object OBJ to the second sensing cell RX may be caused (or may occur). Accordingly, it is difficult for the touch sensing circuit TSC to determine whether the electric field applied to the second sensing cell RX is decreased or maintained.

As can be appreciated from FIG. 6, because most of the electric field generated from the object OBJ in the LGM environment is retransmitted to the second sensing cells RA9a, RA9b, RA9c, and RA9d coupled to the same node, it is difficult for the sensing channel 222 coupled to the corresponding node to determine whether a touch by the object OBJ has occurred.

FIG. 7 is a view for explaining a sensing unit in a self-capacitance driving mode including the sensing area of FIG. 4 according to some exemplary embodiments.

As described above with reference to FIG. 3, the touch sensor TS may operate in a self-capacitance driving mode.

When the first sensing cells (e.g., TA1a, TA1b, TA1c, TA1d, TA1e, TA1f, TA1g, and TA1h) coupled to the same node are distributed among all sensing blocks as in the sensing area SAA, it is difficult to determine whether self-capacitance is formed between an object OBJ and the first sensing cells TA1a, TA1b, TA1c, TA1d, TA1e, TA1f, TA1g, and TA1h or self-capacitance is formed between the object OBJ and lines coupling the first sensing cells TA1a, TA1b, TA1c, TA1d, TA1e, TA1f, TA1g, and TA1h even though none of the first sensing cells TA1a, TA1b, TA1c, TA1d, TA1e, TA1f, TA1g, and TA1h is touched (e.g., whether a ghost touch is generated).

Accordingly, when the touch sensor TS operates in a self-capacitance driving mode in the arrangement shown in FIG. 7, a touch position may be detected only using the second sensing cells RA1a to RA26d. Accordingly, a detectable touch position becomes the center SSA of each of the sensing blocks. Accordingly, the touch resolution in a self-capacitance driving mode (as shown in FIG. 7) is less than the touch resolution in a mutual capacitance driving mode (as shown in FIG. 5) in the exemplary embodiments described in association with FIGS. 4 to 7.

Figure 12:
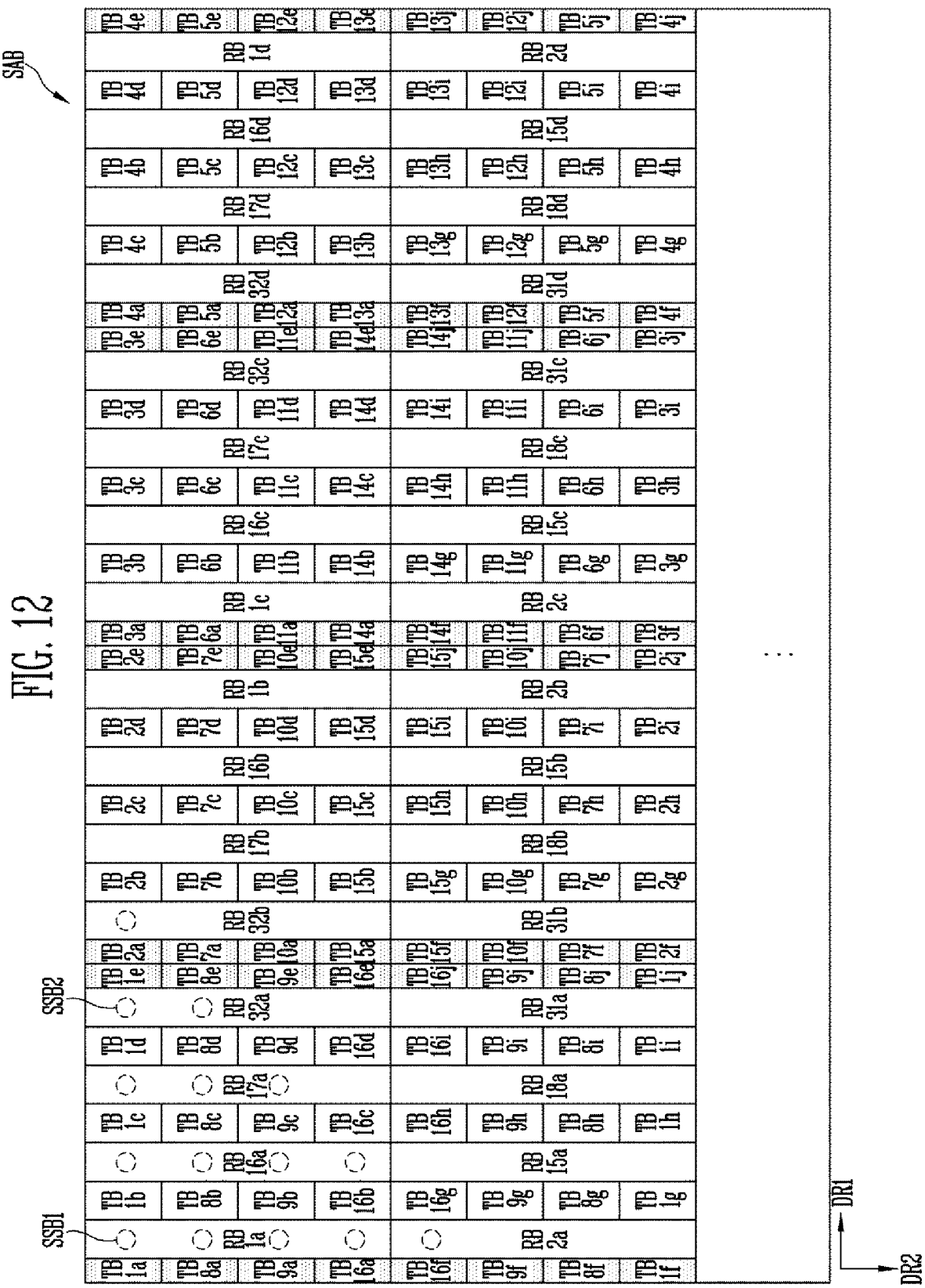
FIG. 12 is a view for explaining a sensing unit in a self-capacitance driving mode including the sensing area of FIG. 8 according to some exemplary embodiments.

Hereinafter, a sensing area SAB will be described with reference to FIGS. 8 to 12. In FIGS. 8 to 11, a description based on a mutual capacitance driving mode will be made. In FIG. 12, a description based on a self-capacitance driving mode will be made.

Figure 8:
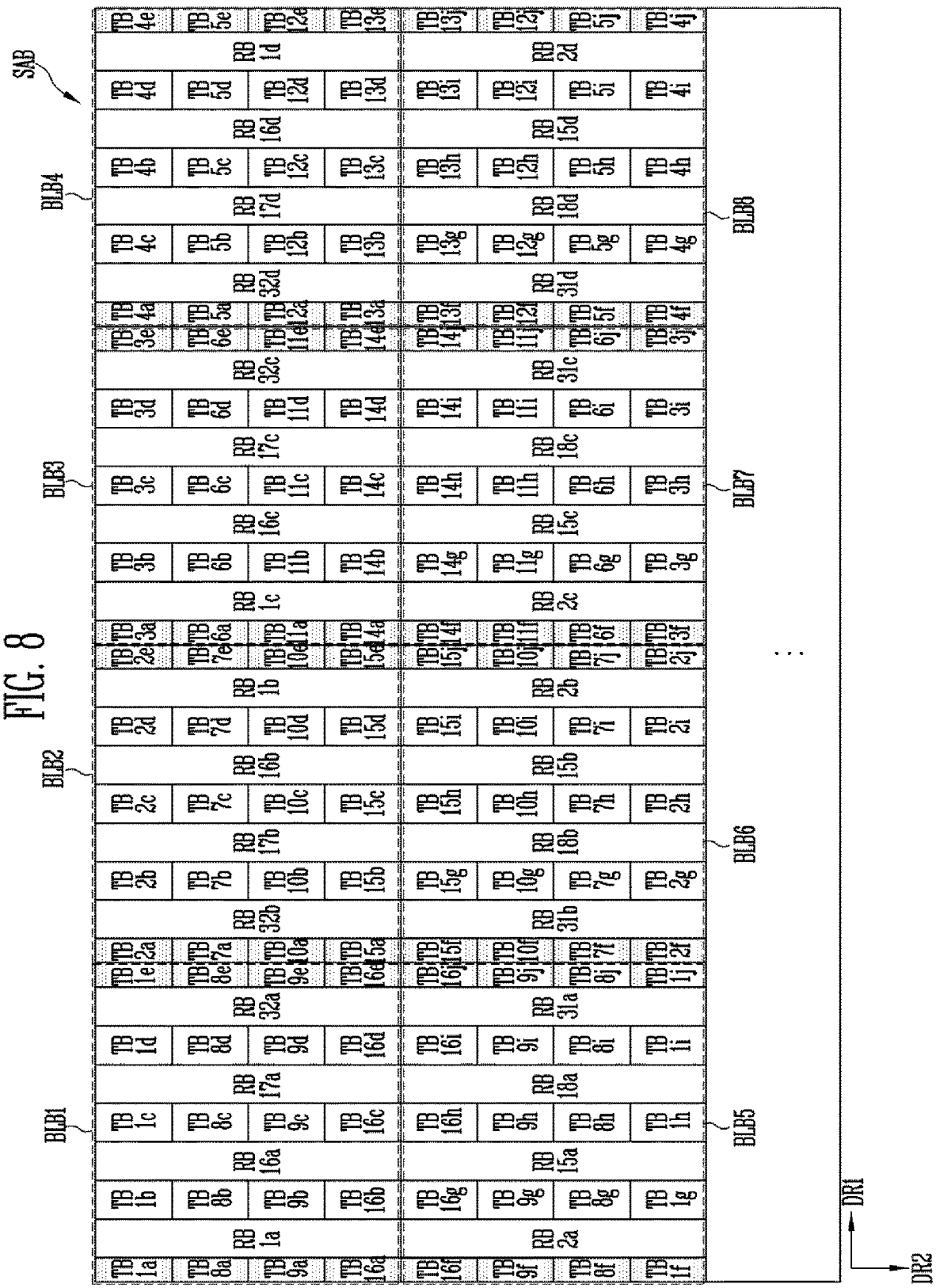
FIG. 8 is a view for explaining a sensing area according to some exemplary embodiments.

FIG. 8 is a view for explaining a sensing area according to some exemplary embodiments.

Referring to FIG. 8, the sensing area SAB includes multiple sensing blocks BLB1, BLB2, BLB3, BLB4, BLB5, BLB6, BLB7, and BLB8. The sensing blocks BLB1 to BLB8 include first sensing cells TB1a to TB4j and second sensing cells RB1a to RB2d corresponding thereto. For example, the sensing block BLB1 may include the first sensing cells TB1a to TB16e and the second sensing cells RB1a to RB32a.

The first sensing cells TB1a, TB1b, TB1c, TB1d, and TB1e of a first group may be arranged in a first direction DR1, may be spaced apart from each other with first separation areas therebetween, and may be coupled to the same first node.

The first sensing cells TB8a, TB8b, TB8c, TB8d, and TB8e of a second group may be arranged in the first direction DR1, may be spaced apart from each other with second separation areas therebetween, and may be coupled to the same second node. The first sensing cells TB8a, TB8b, TB8c, TB8d, and TB8e of the second group may be placed (or arranged) in a second direction DR2 relative to the first sensing cells TB1a, TB1b, TB1c, TB1d, and TB1e of the first group. For example, the second direction DR2 may be perpendicular to the first direction DR1. The first node may be different from the second node.

The second sensing cells RB1a, RB16a, RB17a, and RB32a may respectively extend in the second direction DR2 in the first separation areas and the second separation areas. The second sensing cells RB1a, RB16a, RB17a, and RB32a may have different electrical nodes. For instance, the second sensing cells RB1a, RB16a, RB17a, and RB32a may be coupled to different sensing channels 222.

Also, for example, the sensing block BLB2 may include the first sensing cells TB2a to TB15e and the second sensing cells RB32b to RB1b.

The first sensing cells TB2a, TB2b, TB2c, TB2d, and TB2e of a third group may be arranged in the first direction DR1, may be spaced apart from each other with third separation areas therebetween, and may be coupled to the same third node. The first sensing cells TB7a, TB7b, TB7c, TB7d, and TB7e of a fourth group may be arranged in the first direction DR1, may be spaced apart from each other with fourth separation areas therebetween, and may be coupled to the same fourth node. The first sensing cells TB7a, TB7b, TB7c, TB7d, and TB7e of the fourth group may be placed in the second direction DR2 relative to the first sensing cells TB2a, TB2b, TB2c, TB2d, and TB2e of the third group. The third node may be different from the fourth node.

The second sensing cells RB32b, RB17b, RB16b, and RB1b may respectively extend in the second direction DR2 in the third separation areas and the fourth separation areas. The second sensing cells RB32b, RB17b, RB16b, and RB1b may have different electrical nodes. That is, the second sensing cells RB32b, RB17b, RB16b and RB1b may be coupled to different sensing channels 222.

According to some exemplary embodiments, the first sensing cells placed at the borders of the respective sensing blocks BLB1 and BLB2 adjacent in the first direction DR1 may have different electrical nodes. For example, the first sensing cells TB1e and TB2a may be coupled to different nodes, the first sensing cells TB8e and TB7a may be coupled to different nodes, the first sensing cells TB9e and TB10a may be coupled to different nodes, and the first sensing cells TB16e and TB15a may be coupled to different nodes.

In FIG. 8, each of the sensing blocks is illustrated including four second sensing cells. Exemplary embodiments, however, are not limited thereto. For instance, in some exemplary embodiments, each of the sensing blocks may be configured to include at least two second sensing cells. For example, each of the sensing blocks may include two second sensing cells or three second sensing cells.

In FIG. 8, each group is illustrated including five first sensing cells, but exemplary embodiments are not limited thereto. For instance, in some exemplary embodiments, when the number of second sensing cells included in each of the sensing blocks is changed, the number of first sensing cells in each group may also be changed. For example, when the number of second sensing cells included in each of the sensing blocks is n, the number of first sensing cells in each group may be n+1. Here, n may be an integer that is greater than one (1).

Figure 9:
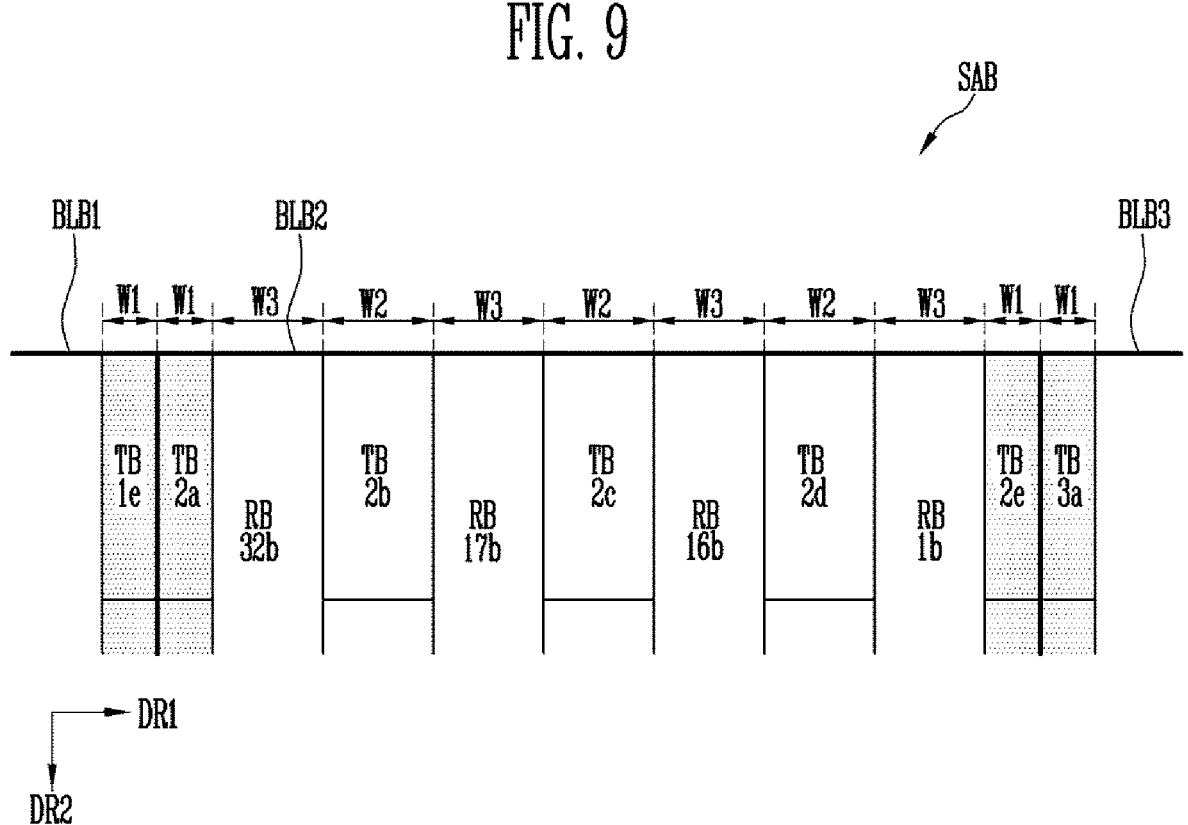
FIG. 9 is an enlarged view of a portion of the sensing area in FIG. 8 according to some exemplary embodiments.
Figure 10:
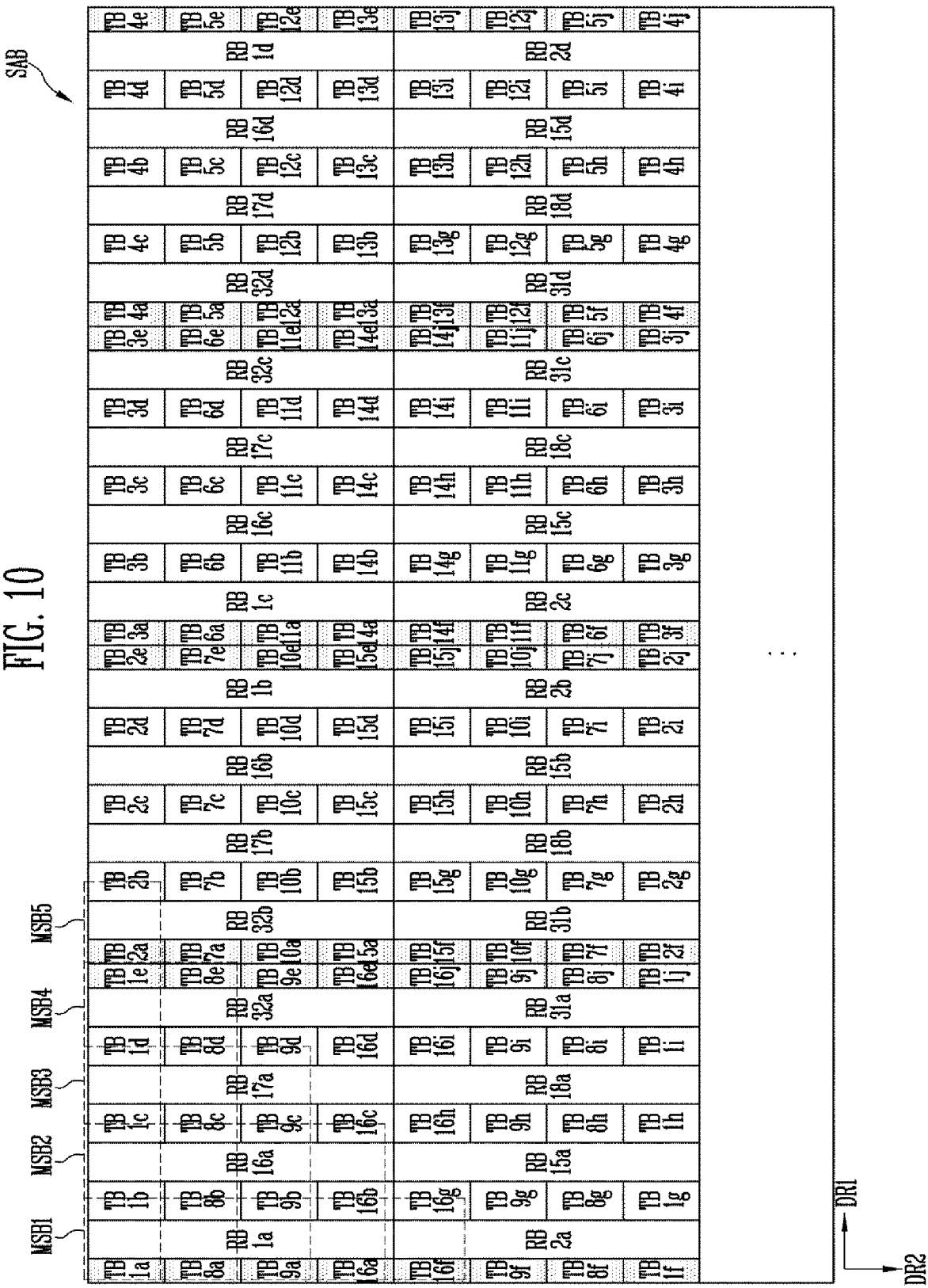
FIG. 10 is a view for explaining a sensing unit in a mutual capacitance driving mode including the sensing area of FIG. 8 according to some exemplary embodiments.

FIG. 9 is an enlarged view of a portion of the sensing area in FIG. 8 according to some exemplary embodiments. FIG. 10 is a view for explaining a sensing unit in a mutual capacitance driving mode including the sensing area of FIG. 8 according to some exemplary embodiments.

Referring to FIG. 9, an enlarged view of portions of the sensing blocks BLB1, BLB2, and BLB3 in FIG. 8 is illustrated.

For example, the first width W1, in the first direction DR1, of each of the first sensing cells TB2a and TB2e, which are placed at opposite borders of the sensing block BLB2, may be less than the second width W2, in the first direction DR1, of each of the first sensing cells TB2b, TB2c, and TB2d, which are not placed at the borders of the sensing block BLB2. For example, the first width W1 may be half of the second width W2. For example, the third width W3, in the first direction DR1, of each of the second sensing cells RB32b, RB17b, RB16b, and RB1b in the sensing block BLB2 may be equal to the second width W2.

For example, referring again to FIG. 8, the first width W1, in the first direction DR1, of each of the first sensing cells placed at the borders of the outermost sensing blocks BLB1, BLB4, BLB5, and BLB8 in the sensing area SAB may be less than the second width W2, in the first direction DR1, of each of the first sensing cells that are not placed at the borders. For example, the first width W1 of each of the first sensing cells TB1a, TB8a, TB9a, and TB16a placed at the outer border of the sensing block BLB1 may be less than the second width W2 of each of the first sensing cells TB1b to TB16d that are not placed at the border. Also, for example, the first width W1 of each of the first sensing cells TB4e, TB5e, TB12e, and TB13e placed at the outer border of the sensing block BLB4 may be less than the second width W2 of each of the first sensing cells TB4b to TB13d that are not placed at the border.

For example, the touch driving circuit TDC may simultaneously supply driving signals Sdr to the first sensing cells TB1a, TB1b, TB1c, TB1d, TB1e, TB1f, TB1g, TB1h, TB1i, and TB1j coupled to the same node. The touch sensing circuit TSC may sense whether a touch is input using the sensing signals Sse input to the multiple sensing channels 222.

Referring to FIG. 10, when the sensing signal Sse input to the sensing channel 222 coupled to the second sensing cells RB1a, RB1b, RB1c, and RB1d is based on the changed mutual capacitance, the touch sensing circuit TSC may sense that a touch is generated in the sensing unit area MSB1.

When the sensing signal Sse input to the sensing channel 222 coupled to the second sensing cells RB16a, RB16b, RB16c, and RB16d is based on the changed mutual capacitance, the touch sensing circuit TSC may sense that a touch is generated in the sensing unit area MSB2.

When the sensing signal Sse input to the sensing channel 222 coupled to the second sensing cells RB17a, RB17b, RB17c, and RB17d is based on the changed mutual capacitance, the touch sensing circuit TSC may sense that a touch is generated in the sensing unit area MSB3.

When the sensing signal Sse input to the sensing channel 222 coupled to the second sensing cells RB32a, RB32b, RB32c, and RB32d is based on the changed mutual capacitance, the touch sensing circuit TSC may sense that a touch is generated in the sensing unit area MSB4.

For example, the touch driving circuit TDC may simultaneously supply driving signals Sdr to the first sensing cells TB2a, TB2b, TB2c, TB2d, TB2e, TB2f, TB2g, TB2h, TB2i, and TB2j coupled to the same node. Here, when the sensing signal Sse input to the sensing channel 222 coupled to the second sensing cells RB32a, RB32b, RB32c, and RB32d is based on the changed mutual capacitance, the touch sensing circuit TSC may sense that a touch is generated in the sensing unit area MSB5.

Accordingly, when exemplary embodiments described in association with FIG. 9 are employed, the size of each of the sensing unit areas MSB1, MSB2, MSB3, MSB4, and MSB5 may be fixed regardless of the positions thereof, as shown in FIG. 10.

Also, at least because there is no sensing unit area straddling the borders of the sensing blocks BLB1 to BLB8, there is no half node. Accordingly, the issue related to a half node, which was described with reference to FIG. 5, is not caused.

Figure 11:
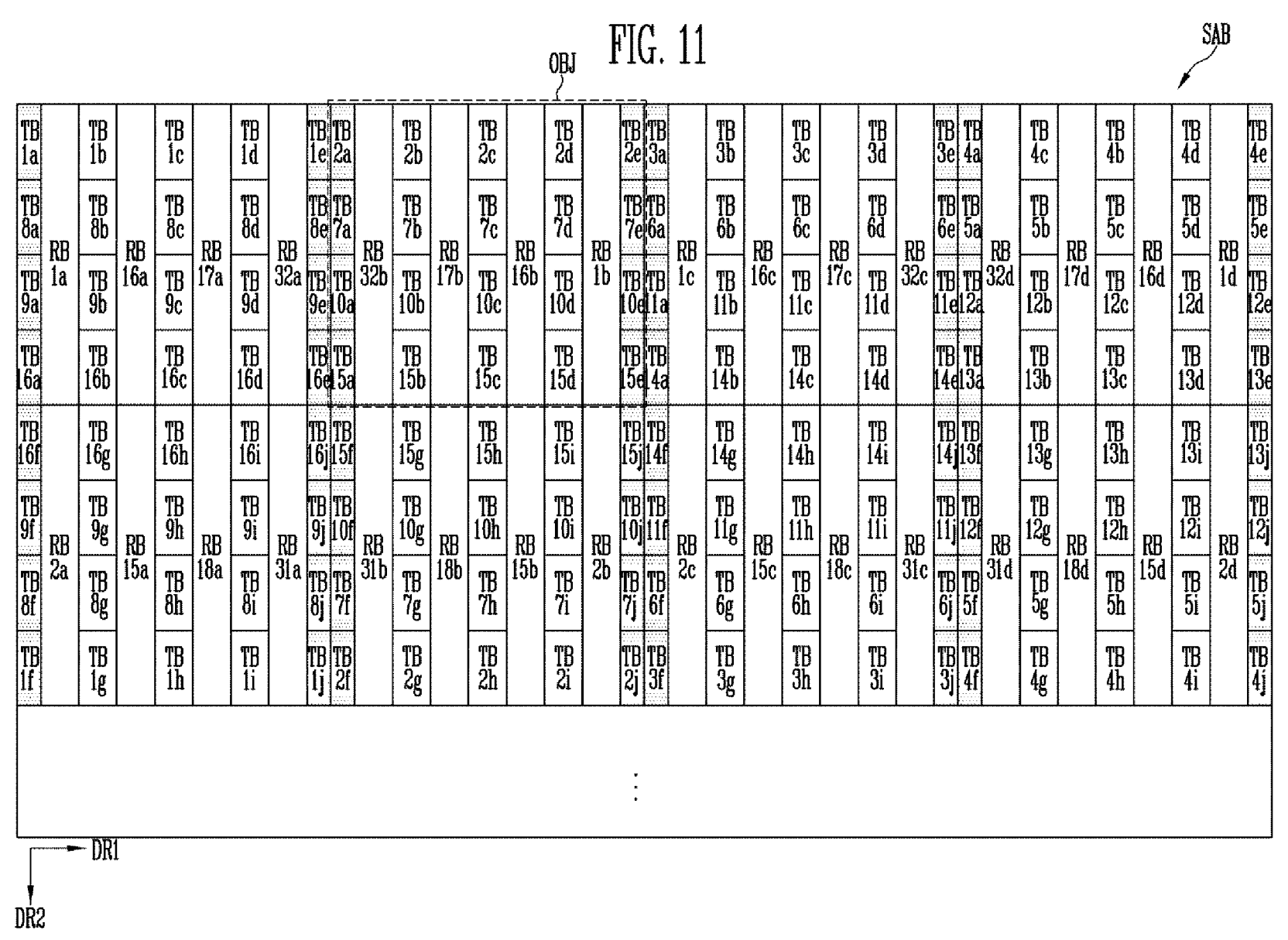

FIG. 11 is a view for explaining a retransmission issue associated with the sensing area of FIG. 8 according to some exemplary embodiments.

For example, it may be assumed that an object OBJ having the extent corresponding to the extent of the sensing block BLB2 is touched on the sensing block BLB2 of the sensing area SAB. Even in the LGM environment in which the object OBJ is not properly grounded, when an electric field generated from the object OBJ is retransmitted, the electric field may be distributed to the second sensing cells RB32b, RB17b, RB16b, and RB1b coupled to different sensing channels 222. Accordingly, the retransmission issue of the touch sensing circuit TSC may be alleviated about four times (e.g., distributed between the second sensing cells RB32b, RB17b, RB16b, and RB1b) as compared to the case described in connection with FIG. 6.

FIG. 12 is a view for explaining a sensing unit in a self-capacitance driving mode including the sensing area of FIG. 8 according to some exemplary embodiments.

Unlike the case described in association with FIG. 7 in which the maximum twenty nodes of the first sensing cells are included in each sensing block (e.g., BLA2), the arrangement of the sensing area SAB in FIG. 12 is configured such that the number of nodes of the first sensing cells TB1a to TB4j included in each of the sensing blocks BLB1 to BLB8 is four.

Accordingly, the touch sensitivity difference between lines and the first sensing cells TB1a to TB4j in the respective groups may be clear, and the first sensing cells TB1a to TB4j may also be used to detect a touch position, unlike the case described in association with FIG. 7. For example, when a touch signal is detected in the first sensing cells TB1a, TB1b, TB1c, TB1d, TB1e, TB1f, TB1g, TB1h, TB1i, and TB1j and when a touch signal is detected in the second sensing cells RB1a, RB1b, RB1c, and RB1d, the touch sensing circuit TSC may detect that a touch is generated at the position SSB1. For example, when a touch signal is detected in the first sensing cells TB1a, TB1b, TB1c, TB1d, TB1e, TB1f, TB1g, TB1h, TB1i, and TB1j and when a touch signal is detected in the second sensing cells RB32a, RB32b, RB32c, and RB32d, the touch sensing circuit TSC may detect that a touch is generated at the position SSB2.

Accordingly, in the various exemplary embodiments of FIGS. 8 to 12, the touch resolution of the self-capacitance driving mode (shown in FIG. 12) may be the same as that of the mutual capacitance driving mode (shown in FIG. 10).

Figure 13:
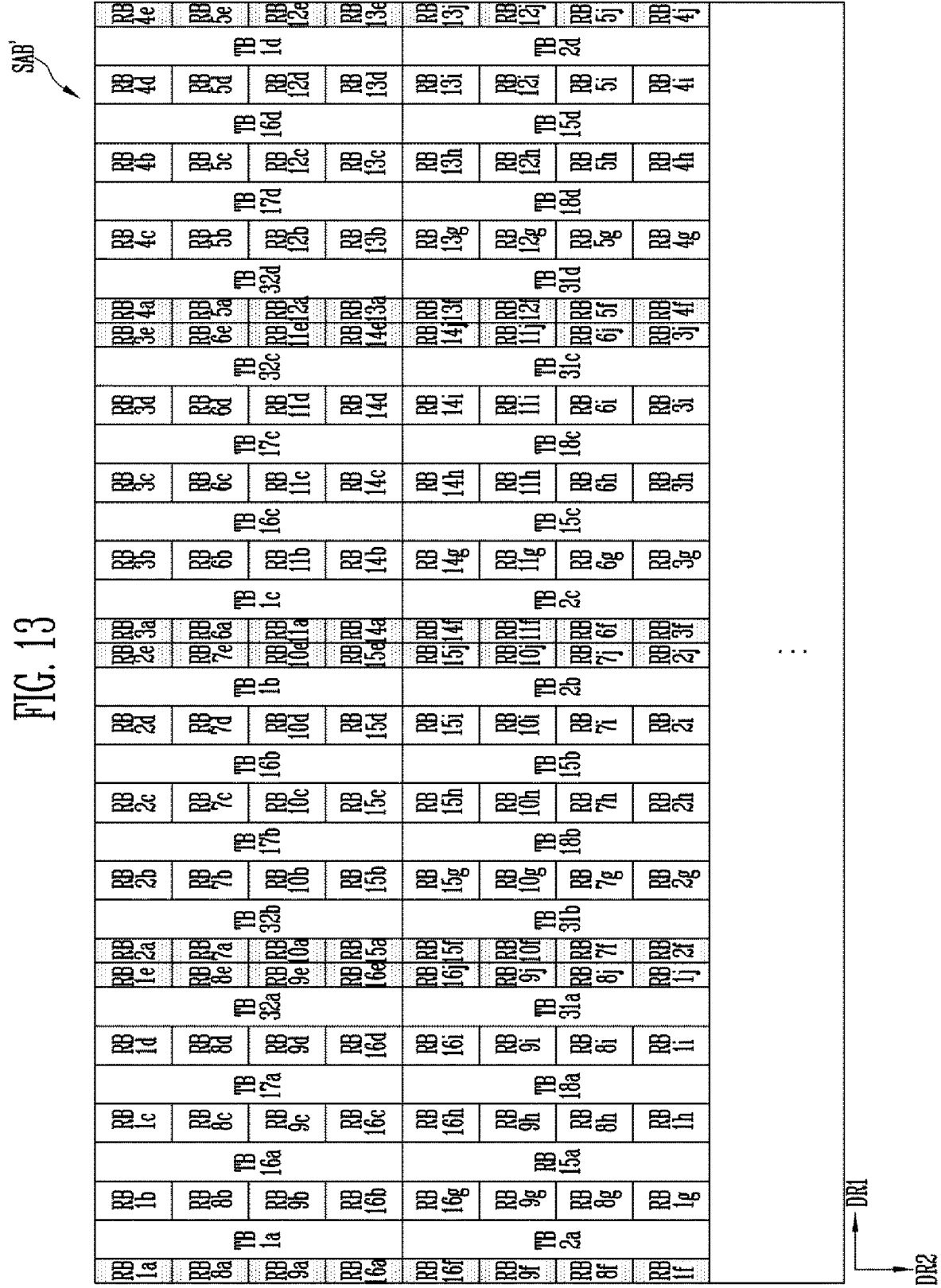
FIG. 13 is a view for explaining a sensing area according to some exemplary embodiments.

FIG. 13 is a view for explaining a sensing area according to some exemplary embodiments.

In the sensing area SAB' in FIG. 13, first sensing electrodes and second sensing electrodes are replaced with each other based on the sensing area SAB in FIGS. 8 to 12.

The sensing area SAB' may be operated in the mutual capacitance driving mode as described below (and with reference to FIG. 2).

The first sensing cells TB1a to TB2d may be coupled to a touch sensing circuit TSC, and the second sensing cells RB1a to RB4j may be coupled to a touch driving circuit TDC.

The touch sensing circuit TSC may include operational amplifiers AMP, and the first sensing cells TB1a to TB2d may be coupled to the first input terminals IN1 of the operational amplifiers AMP. The second input terminals IN2 of the operation amplifiers AMP may be coupled to a reference voltage source GND.

The touch driving circuit TDC may sequentially supply driving signals Sdr to the second sensing cells RB1a to RB4j during a touch sensing period. The touch sensing circuit TSC may include multiple sensing channels 222 electrically coupled to the first sensing cells TB1a to TB2d of each group. Such a touch sensing circuit TSC receives sensing signals Sse from the first sensing cells TB1a to TB2d for the respective driving signals Sdr through the sensing channels 222 and aggregates the received sensing signals Sse, thereby detecting a touch input.

Also, the sensing area SAB' may be operated in a self-capacitance driving mode. However, in the case of the self-capacitance driving mode, because a description is the same as a description of the case of FIG. 3, a repeated description is omitted.

In FIG. 13, each of the sensing blocks is illustrated as including four first sensing cells; however, exemplary embodiments are not limited thereto. For instance, in some exemplary embodiments, each of the sensing blocks may be configured to include at least two first sensing cells. For example, each of the sensing blocks may include two first sensing cells or three first sensing cells.

In FIG. 13, each group is illustrated as including five second sensing cells; however, exemplary embodiments are not limited thereto. For instance, in some exemplary embodiments, when the number of first sensing cells included in each of the sensing blocks is changed, the number of second sensing cells in each group may also be changed. For example, when the number of first sensing cells included in each of the sensing blocks is n, the number of second sensing cells in each group may be n+1. Here, n may be an integer that is greater than 1.

Figure 14:
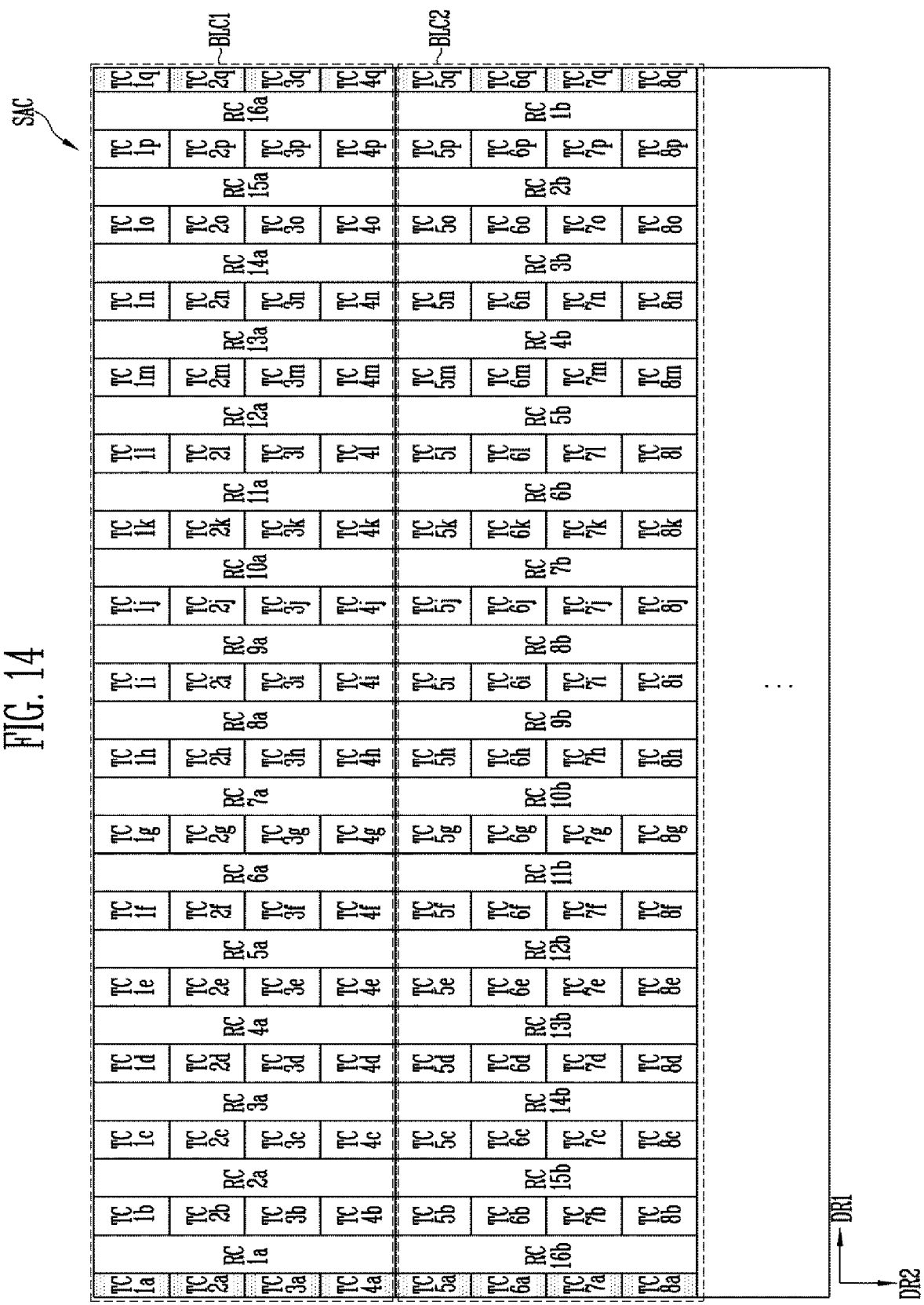
FIGS. 14 and 15 are views for explaining a sensing area according to various exemplary embodiments.
Figure 15:
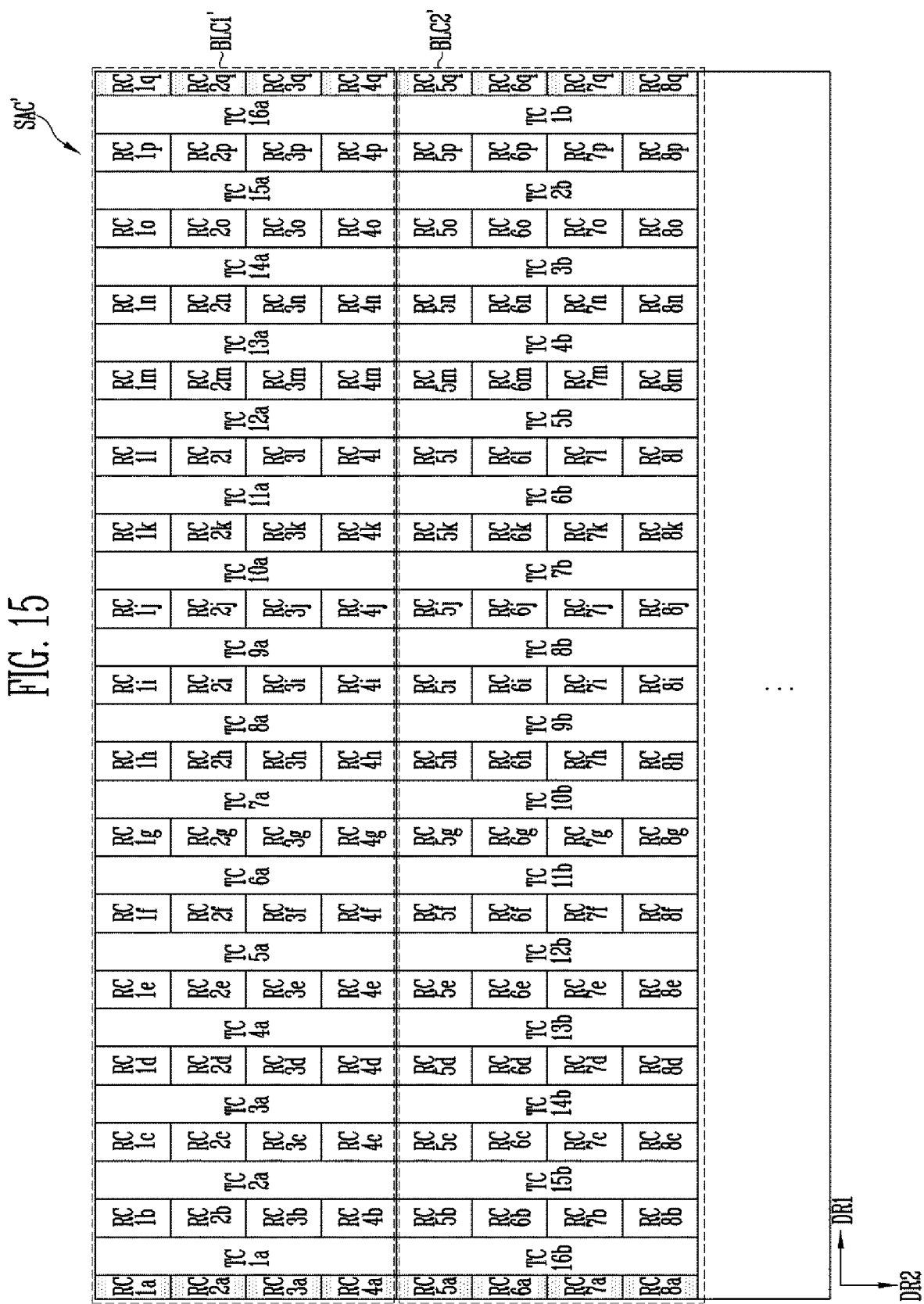

FIGS. 14 and 15 are views for explaining a sensing area according to various exemplary embodiments.

Referring to FIG. 14, a sensing area SAC includes multiple sensing blocks BLC1 and BLC2. The sensing blocks BLC1 and BLC2 may be arranged in a second direction DR2.

The sensing blocks BLC1 and BLC2 include first sensing cells TC1a to TC8q and second sensing cells RC1a to RC16b corresponding thereto.

For example, the sensing block BLC1 may include the first sensing cells TC1a to TC4q and the second sensing cells RC1a to RC16a. The first sensing cells TC1a, TC1b, TC1c, TC1d, TC1e, TC1f, TC1g, TC1h, TC1i, TC1j, TC1k, TC1l, TC1m, TC1n, TC1o, TC1p, and TC1q of a first group may be arranged in a first direction DR1, may be spaced apart from each other with first separation areas therebetween, and may be coupled to the same first node.

Among the first sensing cells TC1a to TC1q of the first group, the outermost first sensing cell TC1q in the first direction DR1 may be the outermost sensing cell of the sensing area SAC in the first direction DR1. Also, among the first sensing cells TC1a to TC1q of the first group, the outermost first sensing cell TC1a in the opposite direction of the first direction DR1 may be the outermost sensing cell of the sensing area SAC in the opposite direction of the first direction DR1.

The width, in the first direction DR1, of each of the outermost first sensing cells TC1a and TC1q may be less than the width, in the first direction DR1, of each of the other first sensing cells TC1b to TC1p of the first group. For example, the width, in the first direction DR1, of each of the outermost first sensing cells TC1a and TC1q may be half of the width, in the first direction DR1, of each of the other first sensing cells TC1b to TC1p of the first group.

The first sensing cells TC2a, TC2b, TC2c, TC2d, TC2e, TC2f, TC2g, TC2h, TC2i, TC2j, TC2k, TC2l, TC2m, TC2n, TC2o, TC2p, and TC2q of a second group may be arranged in the first direction DR1, may be spaced apart from each other with second separation areas therebetween, and may be coupled to the same second node. The first sensing cells TC2a to TC2q of the second group may be placed in the second direction DR2 relative to the first sensing cells TC1a to TC1q of the first group. For example, the second direction DR2 may be perpendicular to the first direction DR1. The first node may be different from the second node.

Among the first sensing cells TC2a to TC2q of the second group, the outermost first sensing cell TC2q in the first direction DR1 may be the outermost sensing cell of the sensing area SAC in the first direction DR1. Also, among the first sensing cells TC2a to TC2q of the second group, the outermost first sensing cell TC2a in the opposite direction of the first direction DR1 may be the outermost sensing cell of the sensing area SAC in the opposite direction of the first direction DR1.

The width, in the first direction DR1, of each of the outermost first sensing cells TC2a and TC2q may be less than the width, in the first direction DR1, of each of the other first sensing cells TC2b to TC2p of the second group. For example, the width, in the first direction DR1, of each of the outermost first sensing cells TC2a and TC2q may be half of the width, in the first direction DR1, of each of the other first sensing cells TC2b to TC2p of the second group.

The second sensing cells RC1a, RC2a, RC3a, RC4a, RC5a, RC6a, RC7a, RC8a, RC9a, RC10a, RC11a, RC12a, RC13a, RC14a, RC15a, and RC16a may respectively extend in the second direction DR2 in the first separation areas and the second separation areas. The second sensing cells RC1a to RC16a may have different electrical nodes. That is, the second sensing cells RC1a to RC16a may be coupled to different sensing channels 222.

Referring to FIG. 15, in the sensing area SAC', the first sensing electrodes and the second sensing electrodes are replaced with each other based on the sensing area SAC in FIG. 14. The sensing area SAC' includes multiple sensing blocks BLC1' and BLC2'. The sensing blocks BLC1' and BLC2' may be arranged in a second direction DR2. The sensing blocks BLC1' and BLC2' include second sensing cells RC1a to RC8q and first sensing cells TC1a to TC16b corresponding thereto. The configurations in FIG. 15 are the same as those in FIG. 14, except that the first sensing electrodes and the second sensing electrodes are replaced with each other, and, thus, a repeated description is omitted.

A touch sensor according to various exemplary embodiments may alleviate a retransmission issue and achieve high sensing resolution in a self-capacitance driving mode.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A touch sensor, comprising:
   sensing blocks,
   wherein each of the sensing blocks comprises:
      first sensing cells of a first group that are arranged in a first direction, spaced apart from each other with first separation areas therebetween, and coupled to an identical first electrical node;
      first sensing cells of a second group that are arranged in the first direction, spaced apart from each other with second separation areas therebetween, and coupled to an identical second electrical node; and
second sensing cells respectively extending in a second direction in the first separation areas and the second separation areas,
wherein first sensing cells at borders of respective sensing blocks adjacent in the first direction are coupled to different electrical nodes.

2. The touch sensor according to claim 1, wherein the second sensing cells in each of the sensing blocks are coupled to different electrical nodes.

3. The touch sensor according to claim 2, wherein:
the first sensing cells of the second group are arranged in the second direction relative to the first sensing cells of the first group; and
the first electrical node and the second electrical node are different from each other.

4. The touch sensor according to claim 3, wherein:
the first sensing cells of the first group and the first sensing cells of the second group are coupled to a touch driving circuit; and
the second sensing cells are coupled to a touch sensing circuit.

5. The touch sensor according to claim 4, wherein:
the touch sensing circuit comprises operational amplifiers; and
the second sensing cells are coupled to first input terminals of the operational amplifiers.

6. The touch sensor according to claim 5, wherein second input terminals of the operational amplifiers are coupled to a reference voltage source.

7. The touch sensor according to claim 4, wherein the touch driving circuit is configured to sequentially supply driving signals to the first sensing cells.

8. The touch sensor according to claim 7, wherein the touch sensing circuit is configured to sense the second sensing cells for each of the driving signals.

9. The touch sensor according to claim 3, wherein:
the first sensing cells of the first group and the first sensing cells of the second group are coupled to a touch sensing circuit; and
the second sensing cells are coupled to a touch driving circuit.

10. The touch sensor according to claim 9, wherein:
the touch sensing circuit comprises operational amplifiers; and
the first sensing cells of the first group and the first sensing cells of the second group are coupled to first input terminals of the operational amplifiers.

11. The touch sensor according to claim 10, wherein second input terminals of the operational amplifiers are coupled to a reference voltage source.

12. The touch sensor according to claim 11, wherein the touch driving circuit is configured to sequentially supply driving signals to the second sensing cells.

13. The touch sensor according to claim 12, wherein the touch sensing circuit is configured to sense the first sensing cells of the first group and the first sensing cells of the second group for each of the driving signals.

14. The touch sensor according to claim 3, wherein the first sensing cells of the first group, the first sensing cells of the second group, the second sensing cells are coupled to a touch sensing circuit.

15. The touch sensor according to claim 14, wherein:
the touch sensing circuit comprises operational amplifiers; and
the first sensing cells of the first group, the first sensing cells of the second group, and the second sensing cells are coupled to first input terminals of the operational amplifiers.

16. The touch sensor according to claim 15, wherein second input terminals of the operational amplifiers are coupled to a touch driving circuit.

17. The touch sensor according to claim 1, wherein a first width, in the first direction, of each of first sensing cells at the borders of the respective sensing blocks is less than a second width, in the first direction, of each of first sensing cells not at the borders.

18. The touch sensor according to claim 17, wherein the first width is half of the second width.

19. The touch sensor according to claim 18, wherein a third width, in the first direction, of each of the second sensing cells is equal to the second width.

20. The touch sensor according to claim 19, wherein the first width, in the first direction, of each of the first sensing cells at the borders of the respective outermost sensing blocks in a sensing area is less than the second width, in the first direction, of each of the first sensing cells not at the borders.

* * * * *